United States Patent [19]
Bisbee et al.

[11] Patent Number: 4,474,423
[45] Date of Patent: Oct. 2, 1984

[54] AUTOMATIC ALIGNMENT APPARATUS FOR OPTICAL FIBER SPLICING

[75] Inventors: Dan L. Bisbee, Oakhurst; Tingye Li, Rumson, both of N.J.

[73] Assignee: AT&T Bell Laboratories, Murray Hill, N.J.

[21] Appl. No.: 159,295

[22] Filed: Jun. 13, 1980

[51] Int. Cl.³ ............................................. G02B 7/26
[52] U.S. Cl. ............................ 350/96.15; 350/96.20
[58] Field of Search ........................... 350/96.15, 96.20

[56] References Cited

U.S. PATENT DOCUMENTS

| | | | |
|---|---|---|---|
| 3,982,123 | 9/1976 | Goell et al. | 350/96.15 X |
| 4,188,087 | 2/1980 | D'Auria et al. | 350/96.20 |
| 4,303,302 | 12/1981 | Ramsey et al. | 350/96.20 |
| 4,329,659 | 5/1982 | Chen | 350/96.15 |

FOREIGN PATENT DOCUMENTS 77640  7/1978  Japan ..................... 350/96.20

OTHER PUBLICATIONS

*Optical and Quantum Electronics*, vol. 9, 1977, pp. 393–397, R. Althammer, "Fully Automatic System for the Coupling Alignment of Optical Fibers".

Primary Examiner—William L. Sikes
Assistant Examiner—Frank González
Attorney, Agent, or Firm—David R. Padnes

[57] ABSTRACT

Automatic apparatus for precisely aligning first and second optical fibers (11, 13) end to end. The first optical fiber is coupled to an optical source (12). An end face (15) of the second fiber abuts an end face (14) of the first fiber. Detector apparatus (16–19 or 51) affixed to the circumference of the second fiber monitors the light transmitted in the cladding of the second fiber and generates a corresponding electrical signal therefrom. This signal is fed to electronic circuitry (27, 28, 7, 8, 31, 32 or 52, 61, 63, 64, 66, 67) which selectively activates fiber moving transducers (41, 42 or 69, 70 or 81, 82) to move the fiber end faces until the cladding light monitored is a minimum. This will maximize the transmitted light between the fiber cores. Once this optimum alignment is achieved, this position is maintained by the transducers.

9 Claims, 5 Drawing Figures

AUTOMATIC ALIGNMENT APPARATUS FOR OPTICAL FIBER SPLICING

TECHNICAL FIELD

This invention relates to optical fibers and, more particularly, to apparatus for automatically aligning two optical fibers.

BACKGROUND OF THE INVENTION

The successful, wide-spread implementation of optical fibers in telecommunications applications requires the ability to splice two optical fibers end-to-end with a minimum of signal loss. A prerequisite for such splicing is the precise end-to-end alignment of the light transmitting fiber cores. Furthermore, this alignment of the fiber cores must be maintained during the splicing operation.

In the prior art, manual alignment of two optical fibers has been achieved using complex mechanical manipulators to move a first fiber relative to a second fiber while observing the core light transmitted from the first fiber to the second using a photodetector at the far end of the second fiber.

More recently, as disclosed in a publication entitled "Fully Automatic System for the Coupling Alignment of Optical Fibers", by R. Althammer, *Optical and Quantum Electronics,* Vol. 9, 1977, pages 393-397, the core light transmitted from a first to a second fiber is monitored at the far end of the second fiber and fed back to electronic circuitry. The electronic circuitry selectively actuates stepping monitors to move the abutting fiber ends into optimum alignment. While this approach provides satisfactory results for multimode fibers, the apparatus is not useable for monomode fibers which have smaller core diameters. (See page 394). In addition, the alignment apparatus is unwieldy for field use as access to the far end of the second fiber is not always readily available.

Monomode fibers transmit higher-bit-rate optical signals with less dispersion per unit distance than multimode fibers and provide a significant benefit in high-speed, long-haul transmission systems. Accordingly, apparatus capable of automatically aligning monomode as well as multimode fibers and maintaining the alignment during splicing is very desirable.

SUMMARY OF THE INVENTION

In accordance with the present invention two optical fibers, either monomode or multimode, are automatically aligned end-to-end for minimum signal loss. Such alignment is provided by monitoring the light coupled into the optical fiber cladding. A first optical fiber is coupled to an optical source. A second optical fiber, aligned end-to-end with the first, has optical detector apparatus affixed to the circumference. The detector apparatus monitors the light coupled from the first optical fiber into the cladding of the second fiber and generates a corresponding electrical signal therefrom. The electrical signal generated by the detector apparatus is supplied to electronic circuitry that selectively actuates orthogonally disposed transducers which vary the relative position between the abutting fibers end faces. Preferably, these transducers are piezoelectric transducers. The actuation process continues until the power coupled between the optical fiber cladding is minimized, which is equivalent to maximizing the transmitted power in the core. Once this optimum aligned position is achieved, it is maintained by the transducers until fiber splicing is completed.

Two detector and two transducer arrangements are disclosed. In the first embodiment, two pairs of detectors, each pair orthogonal to the other, are affixed to the second fiber. In the second embodiment, a single detector is affixed to the second fiber to monitor the light in the cladding therein. Finally, the transducers which vary the relative position between the fibers are either directly affixed to a preselected fiber or are affixed to a Vee-block which retains a preselected fiber.

A feature of the present invention is its adaptability for field use.

DETAILED DESCRIPTION

Figure 1:
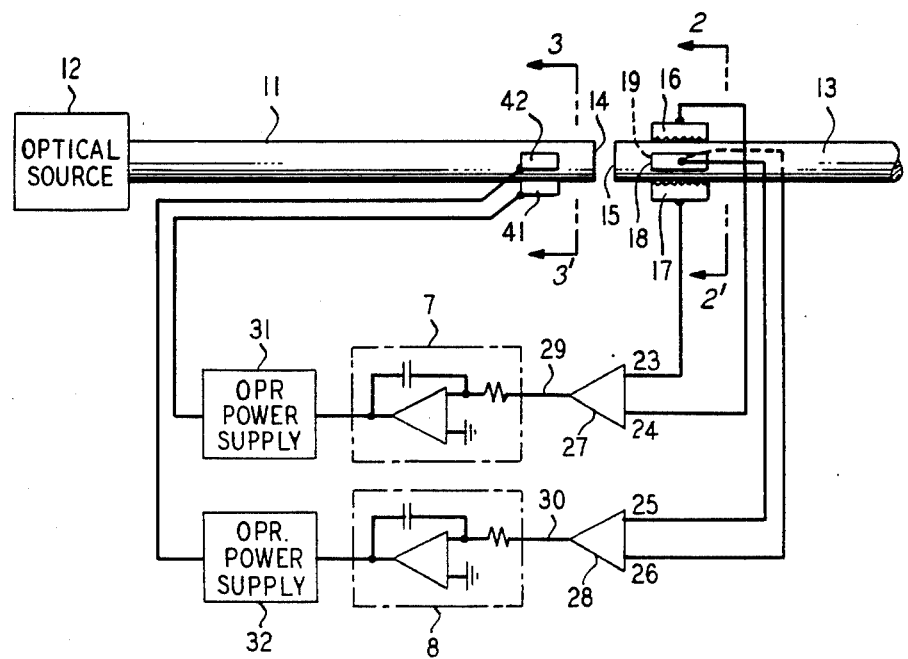
FIG. 1 shows an embodiment of the present invention for aligning first and second optical fibers.
Figure 2:
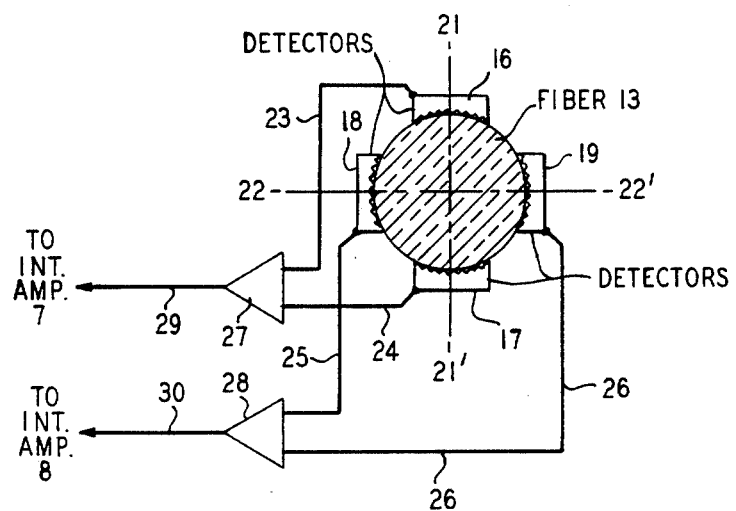
FIG. 2 is a sectional view taken along the line 2—2' of FIG. 1 and shows the disposition of the optical detectors about the second optical fiber.
Figure 3:
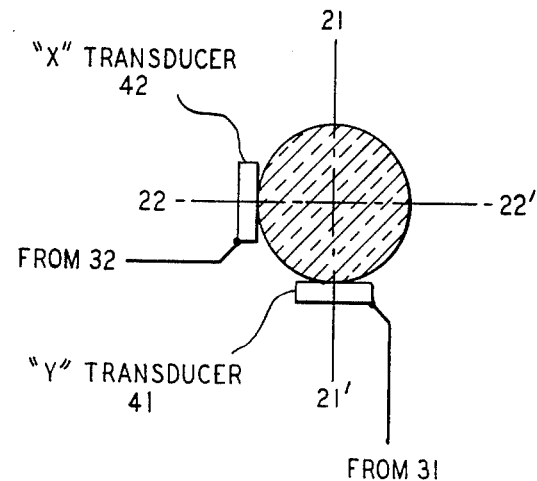
FIG. 3 is a sectional view taken along the line 3—3' of FIG. 1 and shows the placement of the transducers about the first optical fiber.

Referring to FIGS. 1, 2 and 3, optical fiber 11 is coupled to an optical source 12, such as a laser or light emitting diode. Optical fiber 13 is coarsely aligned with optical fiber 11, i.e., only a portion of the end faces 14 and 15 of fibers 11 and 13, respectively, are in abutment. For purposes of clarity, end faces 14 and 15 in FIG. 1 are shown displaced from one another. End faces 14 and 15 are both substantially perpendicular to the longitudinal axis of fibers 11 and 13. Precise alignment of fiber 13 to fiber 11 is achieved by monitoring the light transmitted from fiber 11 into the cladding of fiber 13 using detectors 16, 17, 18 and 19.

Fibers 11 and 13 are substantially identical monomode or multimode fibers having a low optical loss core surrounded by cladding with a lower refractive index than that of the core. The index of refraction of the core may be uniform or radially graded with the maximum index along the longitudinal or central axis of the core. In either case, optical power comprising one or more modes is generally confined within the inner core with little power in the outer cladding. Hence, when fibers 11 and 13 are optimally aligned, the optical signal in the cladding of fiber 13 is a minimum. The degree of alignment required for monomode fibers is, of course, greater due to the smaller core diameter of monomode fibers as against multimode fibers. For example, the core diameter of monomode fibers is typically only 5 to 10 microns as compared to the 50 to 60 micron core diameter of multimode fibers.

In a first embodiment, four detectors 16, 17, 18 and 19 are orthogonally disposed with respect to one another and affixed to the circumference of optical fiber 13 using an adhesive (or held in contact using a spring, not illustrated). This relationship is shown in FIG. 2. For optimum sensitivity all four detectors should be located close as possible to end face 15 of fiber 13. Detectors 16 and 17 comprise a first pair which is located on plane 21—21' passing through the center of optical fiber 13. A second pair of detectors 18 and 19 are disposed on a second plane 22—22' which passes through the center of fiber 13 and 15 and is orthogonal to plane 21—21'. Each detector monitors the light in the cladding material at the point of affixation and generates an electrical signal which directly varies with the amount of light detected. Such detectors are known in the art. See, for example, U.S. Pat. No. 3,982,123 to J. E. Goell et al, issued Sept. 21, 1976. It should be noted, however, that in the referenced patent the detector monitors the light in the core as opposed to the present monitoring of the cladding light. Accordingly, bending of the fiber or stripping of the fiber cladding as discussed in the referenced patent is not necessary.

The electrical signals generated by detectors 16 and 17 are conducted through leads 23 and 24, respectively, to difference amplifier 27. Similarly, difference amplifier 28 receives electrical signals generated by detectors 18 and 19 via leads 25 and 26, respectively. Each difference amplifier generates an output signal equal to the algebraic difference between the supplied input signals. These output signals are coupled by leads 29 and 30 to integrating operational amplifiers 7 and 8 and thence operational power supplies 31 and 32 which actuate fiber moving transducers to bring fibers 11 and 13 into precise alignment. Integrating operational amplifiers 7 and 8 provide an output equal to minus the integral of the signal output from the serially connected difference amplifier. Operational supplies 31 and 32, such as the BOP 500, manufactured by the KEPCO Corporation, are programmed to produce an output signal proportional to the input signal and of the same polarity. In addition, when the supplied input signal is zero, the supply will continue to generate the previously existing output signal. Consequently, once fiber end faces 14 and 15 are aligned, they are so maintained during subsequent splicing.

Refer now to FIG. 3. The output from programmable power supply 31 is connected to transducer 41 to displace fiber 11 in a direction parallel to plane 21—21'. In similar fashion, the output from programmable power supply 32 is coupled to transducer 42 to provide movement to fiber 11 in a direction parallel to plane 22—22'. Transducers 41 and 42 are preferably piezoelectric transducers so that very precise and continuous movement of fiber 13 can be achieved. Both transducers 41 and 42 can be bonded to the circumference of fiber 11 using an adhesive.

Figure 4:
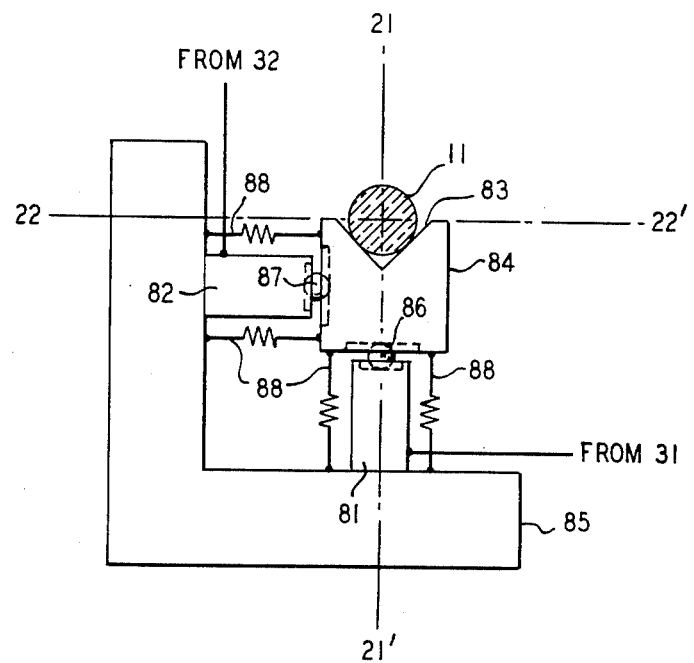
FIG. 4 is an alternative arrangement of transducers to that shown in FIG. 3.

Bonding of the transducers to the optical fiber can be eliminated using the arrangement of FIG. 4. Transducers 81 and 82, preferably piezoelectric transducers, are respectively connected to operational power supplies 31 and 32. Fiber 11 is maintained in a stable position within V-groove 83 in block 84. Each transducer is disposed between block 84 and base 85. Independent movement of transducers 81 and 82 is assured by the use of ball bearings 86 and 87. Each ball bearing is located within an aperture formed by a Vee-groove running parallel to the sectional plane 3—3' in block 84 and in each transducer. Springs 88 provide compressive forces between block 84 and base 85 to maintain physical contact from each transducer, through a ball bearing to block 84. Upon activation, transducers 81 and 82 provide movement of block 83 and fiber 11 parallel to planes 21—21' and 22—22', respectively.

Figure 5:
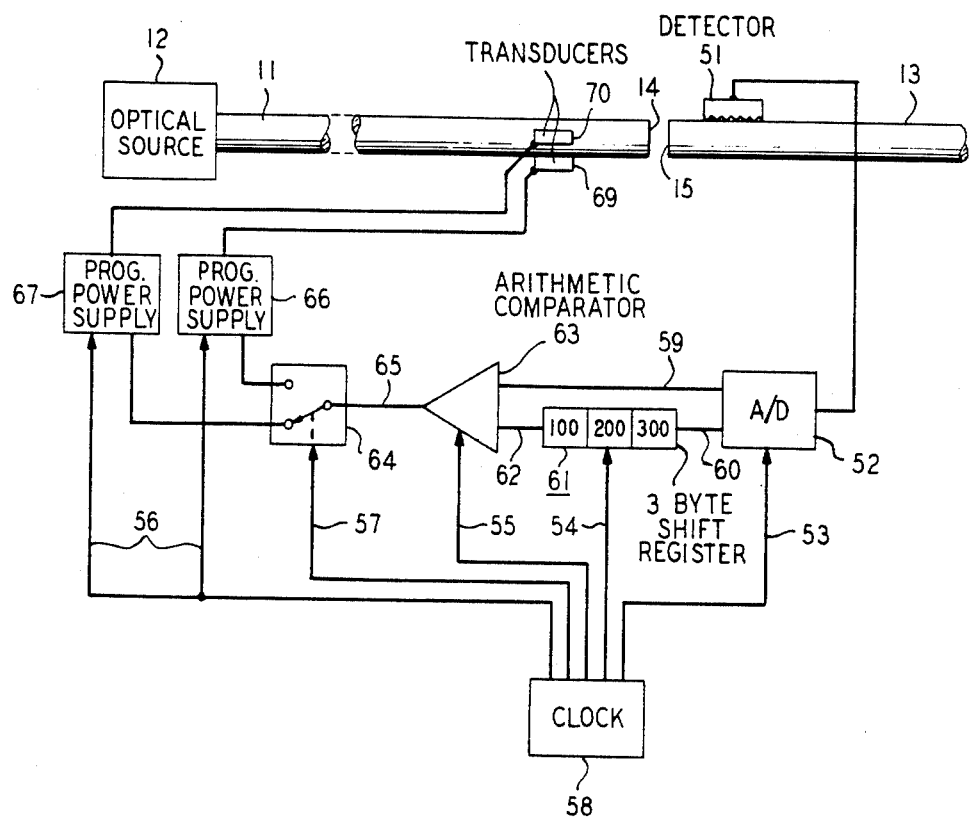
FIG. 5 is a second embodiment of the present invention.

Another embodiment of the present invention is illustrated in FIG. 5. A single detector 51 is affixed to optical fiber 13 to monitor the light transmitted in the cladding therein. Detector 51 is disposed 10 centimeters or more from end face 15 of fiber 13. This positioning reduces alignment errors caused by any non-homogeneous distribution of light in the fiber cladding. The electrical signal generated by detector 51 is coupled to an analog to digital converter 52 which samples the electrical signal and generates a byte, i.e., multiple binary digit, representation therefrom. The sampling rate is controlled by a signal from clock 58 which is coupled to converter 52 via lead 53. Each byte representation appears on leads 59 and 60. Lead 59 is directly coupled to arithmetic comparator 63 while lead 60 is connected to 3-byte shift register 61 which comprises cells 100, 200 and 300. Register 61 is also clocked by clock 58 via lead 54. Upon each clock pulse, the signal on lead 60 is written into cell 300 after shifting the contents of each cell one cell to the left, i.e., from cell 300 to cell 200 and from cell 200 to cell 100. The contents of cell 100 are immediately read out onto lead 62. Arithmetic comparator 63 compares the bytes on leads 59 and 62 and generates their arithmetic difference at the output. This difference represents the positive or negative change between the last sample from detector 51 and two samples prior. The output of arithmetic comparator 63 is coupled to switch 64 by lead 65. Switch 64, although illustratively represented as a mechanical switch, is a flip-flop controlled by clock pulses 58 conducted on lead 57. Switch 64 demultiplexes successive outputs from comparator 63 and supplies them to programmable power supplies 66 and 67. Supplies 66 and 67, clocked via clock signals on lead 56, generate an output signal proportional but opposite in polarity to the input signal received. In addition, if the input received is less than some preselected minimum signal, the supply repeats the last generated signal. Supplies 66 and 67 are respectively connected to transducers 69 and 70. Transducers 69 and 70, are preferably piezoelectric transducers, are affixed to the circumference fiber 11 at substantially right angles to one another on orthogonal planes, such as 21—21' and 22—22'. Each transducer, as in FIG. 3, provides movement of fiber 11 parallel to one plane. The alignment of fibers 11 and 13 is continued until two successive comparisons from comparator 63 are less than the preselected minimum signal. This indicates optimum alignment in both orthogonal planes. Finally, while the use of transducers 69 and 70 affixed to fiber 11 is shown in FIG. 5, the use of the transducer arrangement of FIG. 4 is also directly applicable.

Finally it should, of course, be obvious to those skilled in the art that the transducers in either embodiment while shown disposed about fiber 11 can also be located about fiber 13. Such variation would only require a reversal in polarity of the signals which drive the transducers.

We claim:

1. Apparatus for automatically aligning the end faces (14, 15) of first (11) and second (13) optical fibers wherein said first fiber is coupled to an optical source, said apparatus being characterized by an optical detector for detecting the light transmitted in the cladding of said second fiber at a single location;

means for comparing the light detected by said detector at different times; and means for adjusting the relative position of said fibers in response to said comparison.

2. Apparatus for automatically aligning the adjacent end faces (14, 15) of first (11) and second (13) optical fibers wherein said first fiber is coupled to an optical source, said apparatus being characterized by means (e.g. 51) for detecting the light transmitted in the cladding of said second fiber at a single location and generating a corresponding output signal therefrom, means (e.g. 52, 61, 63) for forming algebraic differences of said output signal between first and second times, and means (e.g. 64, 66, 67, 69, 70) for moving the end faces of said first and second fibers into alignment in a first direction in response to selected ones of said differences and for moving the end faces of said first and second fibers into alignment in a second direction orthogonal to said first direction in response to other ones of said differences.

3. The apparatus of claim 5 wherein said detecting means comprises a light-sensitive surface facing said second fiber at said location.

4. Apparatus for automatically aligning the adjacent end faces (14, 15) of first (11) and second (13) optical fibers wherein said first fiber is coupled to an optical source (12), said apparatus being characterized by means (e.g. 16, 17, 18, 19) for detecting the light at first, second, third and fourth locations in the cladding of said second fiber and generating corresponding first, second, third and fourth output signals, respectively, said detecting means having light-sensitive surfaces facing said second fiber at said locations.

circuit means (e.g. 27, 28) for forming an algebraic difference between said first and second signals and for forming an algebraic difference between said third and fourth signals, and means (e.g. 7, 8, 31, 32, 41, 42) responsive to the difference between said first and second signals for moving the end faces into alignment along a first direction, said moving means also responsive to the difference between said third and fourth signals for moving the end faces into alignment along a second direction orthogonal to said first direction.

5. The apparatus of claim 4 wherein said first and second points are opposite one another and said third and fourth are opposite one another and orthogonally disposed with respect to said first and second points.

6. The apparatus of claims 2, 4 or 5 wherein said moving means comprises piezoelectric transducers.

7. Apparatus for coupling a pair of dielectric optical waveguides which are disposed end-to-end in approximate alignment, said apparatus comprising:

means for transmitting light along a first one of said waveguides such that it is passed across the approximately aligned ends to a second one of said waveguides;

means for sensing light emitted from said first waveguide but not coupled into said second waveguide at at least one position of said second waveguide said sensing means having a light-sensitive surface facing said second waveguide at said at least one position;

means for examining the light sensed at said position in a manner which provides an indication of the relative direction of any misalignment between said waveguide ends; and means for automatically adjusting the relative position of said waveguides in accordance with the indicated direction of misalignment so as to minimize the non-coupled light sensed at said position.

8. The apparatus of claim 7 wherein said adjusting means comprises at least one piezoelectric transducer.

9. The apparatus of claim 7 wherein said sensing means is responsive to the light coupled into a cladding layer disposed about the second one of said waveguides.

* * * * *